United States Patent [19]

Atkins et al.

[11] Patent Number: 4,714,800

[45] Date of Patent: Dec. 22, 1987

[54] STRESS CONTROL/INSULATING COMPOSITE ARTICLE WITH AN OUTER SURFACE HAVING CONVOLUTIONS AND ELECTRIC POWER CABLE TERMINATED THEREWITH

[75] Inventors: Alan D. Atkins; Kenneth Elliott, both of Swindon; John S. T. Looms, East Molesey, all of Great Britain

[73] Assignee: Raychem Corporation, Menlo Park, Calif.

[21] Appl. No.: 881,504

[22] Filed: Jun. 24, 1986

Related U.S. Application Data

[63] Continuation of Ser. No. 681,042, Dec. 12, 1984, abandoned.

[30] Foreign Application Priority Data

Dec. 13, 1983 [GB] United Kingdom ............... 8333249

[51] Int. Cl.[4] .................... H02G 15/068; H01B 17/32; H01B 17/42; H01B 17/64
[52] U.S. Cl. .................................... 174/73 R; 174/80; 174/179; 174/209; 174/212
[58] Field of Search ................... 174/73 R, 73 SC, 80, 174/179, 209, 212

[56] References Cited

U.S. PATENT DOCUMENTS

| | | | |
|---|---|---|---|
| 1,168,019 | 1/1916 | Liversidge | 174/80 X |
| 2,945,913 | 7/1960 | Conangla | 174/73 R |
| 3,377,420 | 4/1968 | Brown et al. | 174/73 R |
| 3,585,274 | 6/1971 | Tomaszewski et al. | 174/73 R |
| 3,673,305 | 6/1972 | Mashikian | 174/73 R X |
| 3,730,970 | 5/1973 | Johnson | 174/73 R |
| 3,737,556 | 6/1973 | Cunningham | 174/73 R X |
| 3,796,821 | 3/1974 | Lusk | 174/73 R |
| 3,950,604 | 4/1976 | Penneck | 174/73 R X |
| 4,045,604 | 8/1977 | Clabburn | 174/73 R X |
| 4,267,403 | 5/1981 | Paragamin | 174/179 X |
| 4,390,745 | 6/1983 | Böttcher et al. | 174/73 R |

FOREIGN PATENT DOCUMENTS

| | | | |
|---|---|---|---|
| 0125884 | 11/1984 | European Pat. Off. | 174/179 |
| 2456410 | 12/1980 | France | 174/73 R |
| 2523361 | 9/1983 | France | 174/179 |
| 54-3171 | 1/1979 | Japan. | |
| 881266 | 11/1961 | United Kingdom | 174/212 |
| 1104265 | 2/1968 | United Kingdom | 174/73 R |
| 2043363 | 1/1983 | United Kingdom | 174/73 R |

Primary Examiner—Laramie E. Askin
Attorney, Agent, or Firm—Edith A. Rice; Herb Burkard

[57] ABSTRACT

A tubular article has an outer component of insulating material having a convoluted outer surface, and an inner component of stress grading material. In another embodiment, a tubular article has an outer component of insulating material having an outer surface that is convoluted along part of its length and shedded along another part of its length. The articles may be of heat-shrinkable polymeric material. The articles are particularly useful for terminating high voltage electric cables, and in the manufacture of electrical insulators.

17 Claims, 5 Drawing Figures

STRESS CONTROL/INSULATING COMPOSITE ARTICLE WITH AN OUTER SURFACE HAVING CONVOLUTIONS AND ELECTRIC POWER CABLE TERMINATED THEREWITH

This application is a continuation of application Ser. No. 681,042, filed Dec. 12, 1984, now abandoned.

DESCRIPTION

The present invention relates to electrically insulating articles, and to electric power cables terminated thereby and electrical insulators formed therefrom.

In terminating a plastic insulated electric power cable, for example, and especially a high voltage cable (i.e. greater than about 1 kV), the outer jacket, usually of polyethylene or PVC, is cut back to expose the underlying cable screen, which screen is itself cut back to expose the primary insulation. The primary insulation is cut back to expose the conductor of the cable, and an electrical connector is then applied to the conductor. The overlying components of the cable then have to be protected, and this will involve, at high voltages, providing some form of stress control. This may conveniently be achieved by the application of a heat-shrinkable polymeric tubing to the cable. The stress control tubing is then usually protected by a further tubing of insulating and track resistant material.

The length of a cable termination is usually characterised by the length of exposed primary insulation, known as the "cutback length", since this is the distance along the cable from the exposed conductor, which will be at high potential, to the cable screen, which will be at earth potential. The cutback length is thus longer the higher the voltage rating of the cable, in order to prevent flashover and to provide the required creepage path length. However, it is usually desirable to have as short a cutback length as possible, not only to minimise the work and materials involved in terminating a cable, but also often in order to fit the termination into a small space, for example a termination box. To this end, it is proposed in U.S. Pat. No. 3,377,420 to provide on the cable insulation a tube of insulating material that has an annularly corrugated exterior, in conjunction with a stress cone. However, such a configuration gives rise to a terminated cable that has a bulky lateral dimension. It is also known to provide sheds or skirts on the termination, either separate from an applied insulating tube or integral therewith, but this also gives rise to a laterally bulky termination. Sheds, however, usually do have to be employed in outdoor or heavily polluted environments in order to avoid the formation of a direct conducting path along the outside of the termination, caused by flow of contaminated rainwater, for example.

UK patent specification No. 1,329,635, discloses an arrangement for controlling the dielectric stress at the termination of a high voltage cable, in which a stress relief tube extends over the cable insulation and is enclosed within an outer housing that is of shedded configuration and is made from porcelain. An insulating dielectric filler, which may be a viscous fluid or a solid or elastomeric dielectric, is provided on each side of the stress relief tube to enhance support of the tube.

It will be appreciated that problems of flashover, and requirements for a specified creepage path length, similarly apply to electrical insulators.

It is one object of the present invention to provide an insulating article that is suitable for use in a cable termination or an electrical insulator and that is of a compact configuration.

In accordance with one aspect of the present invention, there is provided a generally tubular article comprising an outer component of electrically insulating material having a convoluted outer surface extending longitudinally thereof, and an inner component of electrically stress grading material.

The convolutions may extend along part or the whole of the outer surface of the article.

In accordance with another aspect of the present invention, there is a generally tubular article comprising an outer component of electrically insulating material having an outer surface that is convoluted along part of its length and that has a shedded configuration along another part of its length.

The article of said other aspect of the invention may have an inner component of stress grading material.

When the convoluted surface forms only part of the outer surface of the article, the remaining part may be substantially cylindrical, i.e. having no substantial variation in lateral dimension, or it may be shedded, or it may have any combination of convolution/shed/cylindrical configurations. In the latter instance, it is envisaged that the sheds may extend laterally of the article only a short distance, thus maintaining the low profile of the article.

The convolutions may extend annularly around the article or may extend as a helix around and along the article.

The convoluted surface may be generally sinusoidal, or otherwise have periodic protrusions, for example of rectangular, triangular or curvilinear cross-section, including castellated and saw-tooth configurations. The peaks and troughs of the convoluted surface may be of the same length or of different lengths longitudinally of the article, and may be regularly or irregularly spaced. Furthermore, the protrusions need not be symmetrical about the axis of the article, neither need they be continuous therearound. The convolutions may take the form of planes, which may be inclined to the tube axis at an angle other than 90°, and the convolutions may be offset with respect to the tubular axis. The protrusions may extend to one side only of the article, and may be provided by filamentary members.

It will be appreciated that the dimensions of the convolutions, their height, separation and thickness, will depend on the size of the substrate, for example cable diameter, to which the article is to be applied, and typically, the peak-to-trough height will be larger for larger diameter substrates. However, for example, for a cable of diameter of about 20 to 25 mm, and when the convoluted outer surface is generally sinusoidal, the longitudinal peak-to-peak separation is preferably at least about 2.5 mm, and preferably is not more than about 5.0 mm, and the transverse peak-to-trough height is preferably at least about 1.7 mm and preferably is not more than about 3.0 mm. Where the outer surface is shedded, preferably the longitudinal separation is about 9.0 mm, and the transverse height about 7.0 mm. In general, the peak-to-peak separation and the peak-to-trough height would be approximately 15% and 6% respectively of the outer diameter of the article. In general, the ratio of the peak-to-peak distance of convolutions of an externally-convoluted smooth-bore tube to the wall thickness is about 1:1, with a maximum of about 2:1, whereas a shed will extend laterally of its cylindrical core by an appreciably greater amount. In general, a shed has a profile such that its dimension laterally of the core member is several times, at least two times, greater than its dimension longitudinally of the core member.

The term "shed" is used herein not only to include a configuration that is inherently adapted to direct (shed) water, or other liquid pollution, away from its core member, but also to include other configurations that extend laterally of the core member by an appreciable amount even though they may not, by reason for example of their shape or orientation, be suitable for shedding water from the core member.

Preferably an article, or at least the outer insulating component thereof, in accordance with the present invention is made of a polymeric material, which may be a recoverable, for example heat-shrinkable, material. Such material will ensure a close fit of the article on to its substrate, usually dispensing with the need for any filler materials therebetween. The change of dimension, for example diameter, associated with recoverable articles advantageously allows a single article to be used with a range of substrates having different sizes, for example diameters, whilst obtaining a close fit thereto in each case. The recoverable article may have a convoluted, or convoluted and shedded configuration prior to recovery, this being essentially retained on recovery. Preferably, the insulating component has an at least partially convoluted outer surface and a substantially smooth bore, which typically will be a cylindrical bore. Alternatively, the recoverable article may have another configuration, for example, having a smooth outer surface, prior to recovery, and be arranged to recover to the desired configuration. It will be appreciated that a polymeric article in accordance with the present invention may be manufactured conveniently in a length to suit the particular application, and that the desired outer configuration of convolutions, or convolutions and sheds, may be conveniently provided as required.

The inner component may be a coating, or may be a tubing, of stress-grading material, and when a tubing, may be of recoverable, for example heat-shrinkable, material.

When the article comprises two components, these may be co-terminous with each other.

The two components of the article, when present, may be separate, or they may be integral with one another, for example by being co-extruded, by the inner component being an internal coating on the outer component, or by the two components being bonded together by means of an intermediate bonding agent.

The outer surface of the article may also have electrically non-tracking properties.

Although any suitable insulation, and preferably non-tracking, material may be used in the articles of the invention, materials as described in British patent specification Nos. 1,337,951 and 1,337,952, the entire contents of which are incorporated herein by this reference, are preferred. Furthermore, the stress control material may have any suitable composition, but preferred materials include an electrically insulating polymeric material that contains carbon black; a material comprising iron oxide; a material comprising zinc oxide; a material comprising silicon carbide; and a polymeric material disclosed in UK Patent Specification Nos. 1,470,504 or 1,470,501, the entire contents of which are incorporated herein by this reference.

The stress grading or control material used in the articles of the invention may have a linear or a non-linear electrical impedance characteristic. The electrical impedance characteristic of a material is the relationship between the voltage applied to the material and the current consequently flowing therethrough. This can be expressed by the following equation:

$$I = KV\gamma$$

where
I is the current
V is the applied voltage
k is a constant
$\gamma$ is a constant $\geq 1$.

For a material that obeys Ohm's Law, $\gamma = 1$ and the impedance characteristic is a straight line, and thus the material is said to be "linear". For other materials, $\gamma > 1$, and the material is said to be "non-linear". In general, the volume resistivity of the stress grading material will be within the range of from about $10^7$ to $10^{11}$ ohm-cm, and will have a wall or coating thickness of between about 1 and 3.5 mm.

It will thus be appreciated that the performance of electrical equipment to which the article of the invention may be applied can be enhanced appreciably whilst maintaining a low profile. This may result in a cable termination, for example, having an appreciably shorter overall length, or having an enhanced specification for a given, for example conventional, length. Cable terminations, for example, are subject to impulse and other electrical tests, and a particularly stringent test consists of the following condensation test: the terminated cable with a cutback length of 160 mm is placed in an environment where its temperature is reduced to below 0° C. It is then mounted vertically in a humidity chamber that is maintained at 98% relative humidity. An a.c. voltage of 20 kV is applied for 1 minute to the terminated cable conductor, whilst the cable screen is maintained at earth potential. The voltage is increased in steps of 5 kV, being held at each voltage for 1 minute, until flashover occurs. The cycle is then repeated. To pass the test, the termination must withstand at least 45 kV, before flashing over, for three cycles. Conventionally, terminations that satisfy this test have two sheds thereon, such that the outer diameter of the sheds is about three times that of the cable. It has been found that a cable terminated with an article in accordance with the present invention can pass this test with an outer diameter that is not appreciably larger than that of the cable itself. Another termination that would pass the test comprises a cylindrical tubular outer component that has no sheds thereon, but this has to be of appreciably greater length, in order to provide the necessary creepage path length, to be satisfactory. Thus, the excellent performance that can be obtained with a termination employing an article in accordance with the present invention is achieved within a very compact radial and longitudinal configuration. Furthermore, it has surprisingly been found that the improvement in performance of the termination is appreciably greater than would be expected simply from the increased creepage path length achieved by the convoluted outer surface. In this respect, it should also be noted that the convoluted surface does not direct water away from the surface of the article in the manner that a shed does.

An article in accordance with the invention may be mounted on a substrate, for example a porcelain or glass fibre rod, so as to form a high voltage insulator. The insulator may be as disclosed in European aatent application publication No. 0,125,884 A1, the disclosure of which is incorporated herein by this reference.

Generally tubular insulating articles, a cable termination, and an insulator, each in accordance with the present invention, will now be described, by way of example, with reference to the accompanying drawings, in which.

Figure 1:
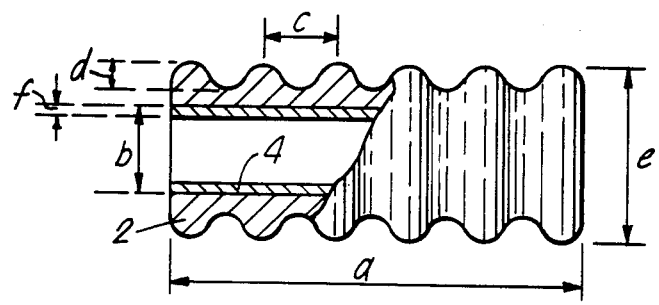
FIGS. 1 and 2 show two embodiments of the articles partly in section.

Referring to FIG. 1, which is not to scale, the article consists of an outer component 2 of heat-shrinkable, non-tracking, polymeric insulating tubing, as sold by Raychem under its Trade Mark HVHC, and an inner component 4 that is a stress grading tubing as sold by Raychem under its Trade Mark SCTM. The SCTM tubing is of about 2 mm wall thickness, after recovery, and has a volume resistivity of about $10^8$ ohm-cm. The outer surface of the HVHC tubing 2 is convoluted with a sinusoidal configuration, and has the following approximate measurements after recovery:

| length | $a =$ | 270 mm |
| internal diameter of component 2, | $b =$ | 27 mm |
| longitudinal peak-to-peak separation, | $c =$ | 4.5 mm |
| peak-to-trough height, | $d =$ | 2.3 mm |
| overall diameter, | $e =$ | 37 mm |
| thickness of component 4, | $f =$ | 1.5 mm |

This article has a total outer surface length along the convolutions of approximately 420 mm.

Figure 2:
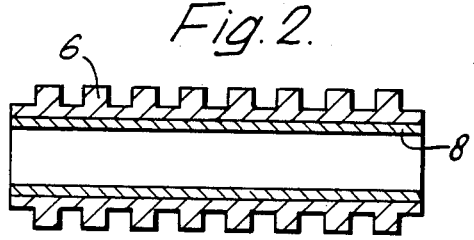

FIG. 2 shows an article in which the convoluted outer surface of the outer component 6 is of square-wave castellated configuration, and has an inner stress grading component 8.

Figure 3:
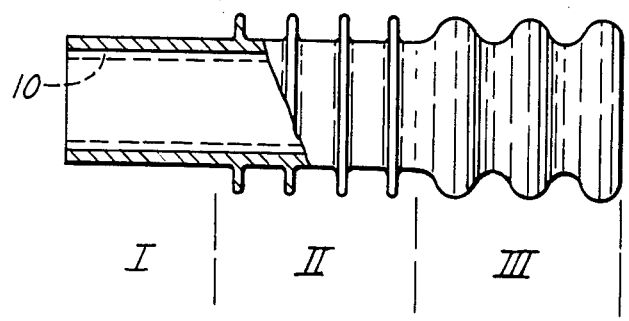
FIG. 3 is a diagrammatic, part-sectional, representation showing some combinations of configurations that the outer surface of an article may have.

FIG. 3 shows diagrammatically an article having three sections: Section I has an outer surface that is cylindrical, Section II has an outer surface that has small sheds thereon, and Section III has an outer surface of sinusoidal convolutions. The article has an outer layer 11 of insulating material and an inner layer 10 of stress grading material. It is envisaged that articles in accordance with the invention may comprise two or more of the Sections shown in FIG. 3 at various locations along the length thereof.

Figure 4:
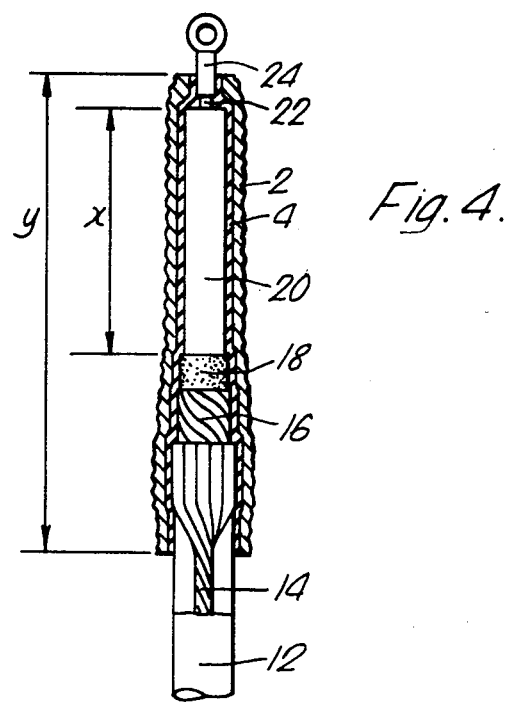
FIG. 4 shows an electric power cable terminated by the article of FIG. 1.

FIG. 4 shows an 11.6/20 kV NAXSY 1×150 mm/25 power cable that has been stripped and subsequently terminated by having heat shrunk thereon the article as configured in accordance with FIG. 1. The cable has a polyethylene jacket 12; a screen that comprises wires 14 that provide the metal shield and that are bent back into a pigtail for convenient earthing, a conductive tape layer 16 of paper or fabric impregnated with carbon black, and conductive paint 18; primary plastic insulation 20, that is exposed for a length x of 160 mm; a conductor 22, and a connecting lug 24 crimped thereonto. The article of FIG. 1 comprising outer and inner components 2, 4 is shrunk, onto the cable, so as to extend for a distance y of 270 mm from the jacket 12 to the lug 24.

The terminated cable as shown in FIG. 4 was Sample No. 1 to be subjected to the above-mentioned Condensation Test. Further similar samples, having insulating articles of different configuration mounted on the cable shown in FIG. 4, were prepared and tested. Finally, samples with articles having an entirely cylindrical outer surface were prepared and tested for comparison. Each sample has an inner component of a linear stress grading material. The samples are deecribed and the test results given below, in which "flashover distance", which is the same in each sample, is the length of the insulating article, and "creepage distance", which is given only approximately, is the actual length of the outer surface of the article.

SAMPLE No. I (FIG. 4)

Outer surface sinusoidally convoluted from lug to ground screen
  Flashover Distance=270 mm
  Creepage Distance=420 mm
  Passed 3 condensation cycles
    Flashover after the 3rd cycle at >60kV*

SAMPLE No. II

Outer surface sinusoidally convoluted for only 80 mm in the middle of the article
  Flashover Distance=270 mm
  Creepage Distance=320 mm
  Passed 3 condensation cycles
    Flashover after the 3rd cycle at 54 kV

SAMPLE No. III

Outer surface sinusoidally convoluted for 95 mm in two sections from each end, with 7 sheds extending over an 80 mm long middle section of the article
  Flashover Distance=270 mm
  Creepage Distance=450 mm
  Passed 3 condensation cycles
    Flashover after the 3rd cycle at >60 kV*

SAMPLE No. IV

Outer surface sinusoidally convoluted for 95 mm in two sections from each end, with 4 sheds extending over an 80 mm long middle section of the article
  Flashover Distance=270 mm
  Creepage Distance=410 mm
  Passed 3 condensation cycles
    Flashover after the 3rd cycle at >60 kV*
*denotes the limit of the HV Transformer used for the tests.

SAMPLE No. V

Outer component of the article consists of Raychem high voltage non-tracking insulating heat-shrinkable polymeric extruded tubing sold under its Trade Name HVTM, extending from lug to ground screen
  Flashover Distance=270 mm
  Creepage Distance=270 mm
  Passed 1 condensation cycle (Failed Test)
    Flashover after the 2nd cycle at 43 kV

SAMPLE No. VI

Outer component of the article consists of Raychem high voltage non-tracking insulating heat-shrinkable polymeric moulded tubing sold under its Trade Name HVTM, extending from lug to ground screen
  Flashover Distance=270 mm
  Creepage Distance=270 mm
  Passed 1 condensation cycle (Failed Test)
    Flashover after the 2nd cycle at 45 kV It can thus be seen that cables terminated with articles of the invention, Samples I to IV, all passed the test, and appreciably improve the performance of the cable termination, do so to a surprising extent, especially when taking into account the relatively small degree of convoluting of the outer surface that is involved, and with a low lateral profile and a short length.

Figure 5:
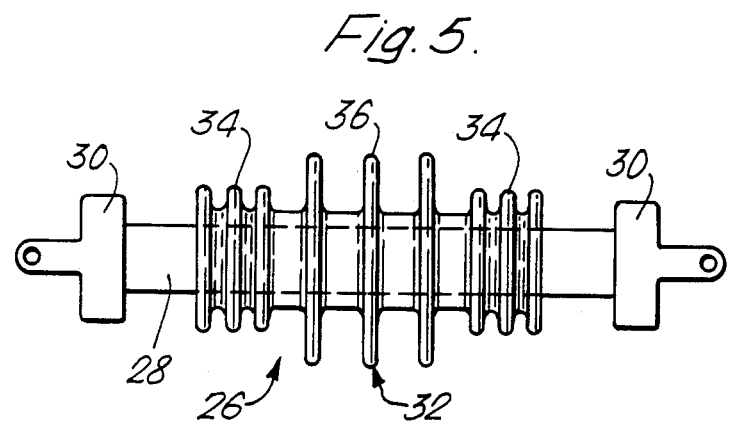
FIG. 5 shows an electrical insulator including an article in accordance with FIG. 3.

Referring to FIG. 5, a high voltage insulator 26 comprises a solid porcelain cylindrical core 28 having a metal end fitting 30 at each end. Further insulation between the end fittings 30 is provided by a heat-shrinkable polymeric tube 32 that has a smooth bore and an outer surface consisting of two convoluted end portions 34 and a shedded intermediate portion 36. The tube 32 is recovered over only a part of the length onto the rod 28, so as to leave exposed at each end a porcelain surface. The polymeric tube 32 is thus spaced from each end fitting 30 by a refractory surface, thereby protecting the polymeric material against electrical discharges, as discussed in European patent application publication No. 0,125,884 A1.

We claim:

1. A generally tubular article comprising an outer component of electrically insulating material having an outer surface extending longitudinally thereof said outer surface having along at least a part of its length a convoluted portion in the form of periodic protrusions and troughs, said protrusions having a peak-to-peak separation and a peak-to-trough height of about 15% and about 6% respectively of the outer diameter of the article; and an inner component of electrically stress grading material.

2. An article according to claim 1, wherein said convoluted portion extends along substantially the whole length of the article.

3. A generally tubular article comprising an outer component of electrically insulating material having an outer surface extending longitudinally thereof, said outer surface having along part of its length of a convoluted portion in the form of periodic protrusions and troughs, said protrusions having a peak-to-peak separation and a peak-to-trough height of about 15% and about 6% respectively of the outer diameter of the article, and along another part of its length a portion with a shedded configuration, each shed having a profile such that its lateral dimension is at least two times greater than its longitudinal dimension; and an inner component of electrically stress grading material.

4. An article according to claim 1 or claim 3 wherein the stress grading component is sustantially co-terminous with the insulating component.

5. An article according to claim 1 or claim 3, wherein said two components are integral with one another.

6. An article according to claim 1 or claim 3, wherein at least part of said outer surface is substantially cylindrical.

7. An article according to claim 1 or claim 3, wherein the insulating material forming said outer surface is substantially electrically non-tracking.

8. An article according to claim 1, wherein at least the insulating component is made from polymeric material.

9. An article according to claim 8, wherein the polymeric material is recoverable.

10. An article according to claim 3, wherein the outer component is made from polymeric material.

11. An article according to claim 10, wherein the polymeric material is recoverable.

12. An article according to claim 9 or claim 11, wherein the recoverable material is heat-shrinkable.

13. An article according to claim 9, wherein the convoluted portion of the insulating component remains convoluted after recovery of said component.

14. An article according to claim 1 or claim 3, wherein the inner surface of the insulating component is substantially smooth.

15. An electric power cable terminated by a generally tubular article comprising an outer component of electrically insulating material having an outer surface extending longitudinally thereof, said outer surface having along at least part of its length a convoluted portion in the form of periodic protrusions and troughs, said protrusions having a peak-to-peak separation and a peak-to-trough height of about 15% and about 6% respectively of the outer diameter of the article, and an inner component of electrically stress grading material.

16. An electric insulator comprising a generally tubular article comprising an outer component of electrically insulating material having an outer surface extending longitudinally thereof, said outer surface having along at least part of its length a convoluted portion in the form of periodic protrusions and troughs, said protrusions having a peak-to-peak separation and a peak-to-trough height of about 15% and about 6% respectively of the outer diameter of the article and an inner component of electrically stress grading material.

17. An electric power cable terminated by a generally tubular article comprising an outer component of electrically insulating material having an outer surface extending longitudinally thereof, said outer surface having along part of its length a convoluted portion in the form of periodic protrusions and troughs, said protrusions having a peak-to-peak separation and a peak-to-trough height of about 15% and about 6% respectively of the outer diameter of the article, and along another part of its length a portion with a shedded configuration, each shed having a profile such that is lateral dimension is at least two times greater than its longitudinal dimension, and an inner component of electrically stress grading material.

* * * * *